(12) United States Patent  (10) Patent No.: US 9,969,478 B2
Mazin  (45) Date of Patent: May 15, 2018

(54) REMOTE CONTROLLED BOAT SYSTEM

(71) Applicant: Ben Mazin, Goleta, CA (US)

(72) Inventor: Ben Mazin, Goleta, CA (US)

( * ) Notice: Subject to any disclaimer, the term of this patent is extended or adjusted under 35 U.S.C. 154(b) by 64 days.

(21) Appl. No.: 14/822,176

(22) Filed: Aug. 10, 2015

(65) Prior Publication Data

US 2017/0045887 A1 Feb. 16, 2017

(51) Int. Cl.
*B63H 25/04* (2006.01)
*G05D 1/00* (2006.01)
*B63B 35/00* (2006.01)

(52) U.S. Cl.
CPC .......... *B63H 25/04* (2013.01); *G05D 1/0038* (2013.01); *G05D 1/0044* (2013.01); *B63B 2035/008* (2013.01); *B63H 2025/045* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,650,774 A * | 7/1997 | Drori | ................ | G07C 9/00111 340/12.23 |
| 5,917,405 A * | 6/1999 | Joao | .................... | B60R 25/018 307/10.2 |
| 6,019,263 A * | 2/2000 | Palmer | ................... | A45F 3/15 114/343 |
| 6,273,771 B1 * | 8/2001 | Buckley | ............... | B63H 21/213 114/144 RE |
| 6,363,324 B1 * | 3/2002 | Hildebrant | ............ | G01C 21/26 342/357.31 |
| 6,394,015 B1 * | 5/2002 | Gabriel | .................. | B63B 43/18 114/151 |
| 6,427,615 B1 * | 8/2002 | Ku | ........................... | B63B 3/08 114/61.3 |
| 6,640,164 B1 * | 10/2003 | Farwell | ............... | G05D 1/0278 180/168 |
| 6,674,401 B2 * | 1/2004 | McBurney | ............. | G01S 19/36 342/357.75 |
| 6,678,589 B2 * | 1/2004 | Robertson | ............. | B63H 25/42 114/246 |
| 6,690,622 B1 * | 2/2004 | Eckberg, Sr. | .......... | A01K 75/00 367/165 |
| 6,752,720 B1 * | 6/2004 | Clapper | .................. | A63F 13/10 446/454 |

(Continued)

OTHER PUBLICATIONS

S. Nolan and D. Toal, "A low directivity ultrasonic sensor for collision avoidance and station keeping on inspection-class AUVs," Journal of Marine Engineering and Technology, 2008, A11:1-11.

*Primary Examiner* — Jonathan L Sample
(74) *Attorney, Agent, or Firm* — Brown Rudnick LLP; Adam M. Schoen

(57) ABSTRACT

The invention generally relates to a remote controlled boat system. In certain embodiments, the system includes a boat having a first central processing unit operably coupled to a communication unit and a first global positioning unit operably coupled to the first central processing unit. The system also includes at least one controller configured to control the boat via remote communication with the first central processing unit via the communication unit of the boat, the controller including a second central processing unit operably coupled to a second global positioning unit.

23 Claims, 11 Drawing Sheets

(56) References Cited

U.S. PATENT DOCUMENTS

| | | | | |
|---|---|---|---|---|
| 7,296,530 | B1* | 11/2007 | Bernstein | B63G 8/001 114/322 |
| 7,398,741 | B2* | 7/2008 | Koda | A63H 23/04 114/144 RE |
| 7,805,146 | B1* | 9/2010 | Beyer, Jr. | G08G 3/00 455/456.1 |
| 7,894,810 | B2* | 2/2011 | Feher | H04M 3/382 340/5.72 |
| 9,471,059 | B1* | 10/2016 | Wilkins | G05D 1/0016 |
| 2001/0039910 | A1* | 11/2001 | Koda | A01K 91/02 114/255 |
| 2002/0070881 | A1* | 6/2002 | Marcarelli | G01S 5/0027 340/988 |
| 2002/0142701 | A1* | 10/2002 | Rosenberg | A63H 30/04 446/454 |
| 2003/0073375 | A1* | 4/2003 | Lee | A63H 23/04 446/153 |
| 2003/0164391 | A1* | 9/2003 | Zwagerman | A45F 3/15 224/576 |
| 2003/0191562 | A1* | 10/2003 | Robertson | B63H 25/42 701/21 |
| 2004/0002282 | A1* | 1/2004 | Lee | A63H 23/04 446/158 |
| 2005/0064785 | A1* | 3/2005 | Lee | A63H 17/26 446/454 |
| 2005/0124234 | A1* | 6/2005 | Sells | B63H 21/24 440/33 |
| 2005/0268834 | A1* | 12/2005 | Koda | A63H 23/04 114/144 RE |
| 2006/0206244 | A1* | 9/2006 | Arvidsson | G05D 1/0016 701/2 |
| 2006/0237239 | A1* | 10/2006 | Bruner | B62B 3/02 180/6.7 |
| 2006/0293102 | A1* | 12/2006 | Kelsey | A63H 30/04 463/37 |
| 2007/0012817 | A1* | 1/2007 | Parmley, Sr. | B60F 5/00 244/2 |
| 2007/0030116 | A1* | 2/2007 | Feher | H04M 3/382 340/5.53 |
| 2007/0093945 | A1* | 4/2007 | Grzywna | G05D 1/101 701/23 |
| 2007/0227429 | A1* | 10/2007 | Okuyama | B63B 49/00 114/146 |
| 2007/0295775 | A1* | 12/2007 | Guenther | A45F 4/02 224/651 |
| 2008/0027591 | A1* | 1/2008 | Lenser | G05D 1/0251 701/2 |
| 2008/0027599 | A1* | 1/2008 | Logan | G05D 1/0234 701/23 |
| 2008/0169779 | A1* | 7/2008 | Samek | B63H 20/007 318/588 |
| 2008/0252519 | A1* | 10/2008 | Moon | G01S 19/05 342/357.42 |
| 2008/0266254 | A1* | 10/2008 | Robbins | G05D 1/0016 345/161 |
| 2009/0037040 | A1* | 2/2009 | Salmon | B63H 17/00 701/21 |
| 2009/0276105 | A1* | 11/2009 | Lacaze | G05D 1/0044 701/2 |
| 2010/0318242 | A1* | 12/2010 | Jacobsen | F41H 13/00 701/2 |
| 2011/0104963 | A1* | 5/2011 | Ellis | B63B 35/71 440/6 |
| 2011/0256792 | A1* | 10/2011 | Silver | A45C 9/00 446/71 |
| 2012/0015566 | A1* | 1/2012 | Salmon | B63H 21/21 440/1 |
| 2012/0229660 | A1* | 9/2012 | Matthews | A63H 30/04 348/207.11 |
| 2012/0232719 | A1* | 9/2012 | Salmon | G05D 1/0206 701/2 |
| 2014/0011421 | A1* | 1/2014 | Martinez | A63H 33/00 446/73 |
| 2014/0080367 | A1* | 3/2014 | Gariepy | B63B 5/24 440/6 |
| 2015/0081169 | A1* | 3/2015 | Pisz | B60H 1/00657 701/36 |
| 2015/0298654 | A1* | 10/2015 | Joao | G01S 19/16 701/2 |
| 2015/0306496 | A1* | 10/2015 | Haseltine | A63F 13/213 463/31 |
| 2015/0370250 | A1* | 12/2015 | Bachrach | G05D 1/0016 701/2 |
| 2015/0370252 | A1* | 12/2015 | Hanson | B60F 5/00 701/2 |
| 2016/0039542 | A1* | 2/2016 | Wang | B60L 11/1809 701/2 |
| 2016/0327950 | A1* | 11/2016 | Bachrach | G05D 1/0016 |

* cited by examiner

REMOTE CONTROLLED BOAT SYSTEM

FIELD OF THE INVENTION

The invention generally relates to a remote controlled boat system.

BACKGROUND

An unmanned vessel is a vessel without a human controller aboard, e.g., unmanned aerial vehicle, unmanned marine craft, or an unmanned land vehicle. Its navigation is controlled either autonomously by onboard computers or by a remote control of an operator on the ground or in another vehicle. Unmanned vessels are usually deployed for military and special operation applications, but are also used in a growing number of civil applications, such as policing and firefighting, and nonmilitary security work, such as inspection of power or pipelines.

Historically, unmanned vessels were simple remotely controlled vessels, but autonomous control is increasingly being employed. The rise in autonomously controlled vessels had led to global positioning systems being installed on such vessels, which facilitates navigation of the unmanned vessel.

SUMMARY

The invention recognizes that increasingly different types of autonomous navigation can be achieved with an unmanned vessel if a global positioning system is included in the remote controller and the unmanned vessel along with a communication system that allows the unmanned vessel and the controller to communicate with each other. For example, having a global positioning system in both the unmanned vessel and the controller allows an operator to command the unmanned vessel to autonomously navigate to the location of the controller, which cannot be achieved with only a global positioning system in the unmanned vessel.

Accordingly, aspects of the invention provide a remote controlled boat system. The system includes a boat having a first central processing unit operably coupled to a communication unit and a first global positioning unit operably coupled to the first central processing unit. The system also includes at least one controller configured to control the boat via remote communication with the first central processing unit via the communication unit of the boat, the controller including a second central processing unit operably coupled to a second global positioning unit. While described in the context of a boat, the skilled artisan will appreciate that the systems of the invention are not limited to a boat, and can apply to all unmanned vessels, such as unmanned aerial vehicles, unmanned marine craft, or an unmanned land vehicles.

There are numerous modes of operation for the boat system of the invention, at least three of which are described herein. However, the skilled artisan will realize that additional modes of operation are possible with both the boat and the controller have global positioning systems, and such additional modes of operation are within the scope of the invention. In a first mode of operation (remote control mode), the first central processing unit executes one or more instructions received from the controller via the communication unit to navigate the boat. In a second mode of operation (stay here or hold mode), the first central processing unit executes one or more instructions received from the controller via the communication unit to maintain a location of the boat utilizing coordinates the first central processing unit receives from the first global positioning unit. In a third mode of operation (come to me or follow me mode), the first central processing unit executes one or more instructions received from the controller via the communication unit to navigate the boat to a location of the controller utilizing coordinates received from the first global positioning unit and coordinates from the second global positioning unit transmitted from the controller to the first central processing unit via the communication unit.

The boat system of the invention can include any one or more of the following features. For example, the boat can include one or more handles configured such that a person can hold onto the boat while the boat is moving. In another embodiment, the boat can include one or more hook-ups configured to couple with a tow line such that a person can be towed by the boat while the boat is moving. The boat can include any type of propulsion unit, such as a gas motor or an electrically powered motor. The boat can include a storage compartment. The boat can further include a local control unit onboard the boat (as opposed to the remote control), allowing an operator to navigate the boat while holding-on or being towed by the boat. The boat can include one or more environmental sensors, such as an ultrasound sensor. The boat can include on or more cameras that transmit one or more video signals to a display screen of the controller. The camera can be located anywhere on the boat, such as mounted in an optically clear portion beneath the boat or mounted on top of the boat.

In certain embodiments, communication between the controller and the boat is encrypted. In certain embodiments, the boat is a submersible boat configured to travel beneath a water surface and the submersible boat further comprises an antenna that remains above the water surface. In other embodiments, the boat is adapted to be transported on a back of an operator.

In certain embodiments, the controller is configured to be worn by an operator. For example, the controller is configured to be worn on a wrist of the operator.

In certain embodiments, the system includes a plurality of controllers, each configured to control the boat via remote communication with the first central processing unit via the communication unit of the boat, wherein the first CPU implements a priority function that determines which of the plurality of controllers has priority to remotely control the boat.

BRIEF DESCRIPTION OF THE DRAWINGS

FIG. 9A shows an embodiment in which the antenna is directly coupled to the hull of the submersible boat. FIG. 9B shows an embodiment in which the antenna is indirectly coupled to the hull of the boat via a connector coupled to a floating member on which the antenna is connected.

DETAILED DESCRIPTION

The invention generally relates to a remote controlled boat system. In certain embodiments, the system includes a boat having a first central processing unit operably coupled to a communication unit and a first global positioning unit operably coupled to the first central processing unit. The system also includes at least one controller configured to control the boat via remote communication with the first central processing unit via the communication unit of the boat, the controller including a second central processing unit operably coupled to a second global positioning unit.

Figure 1:
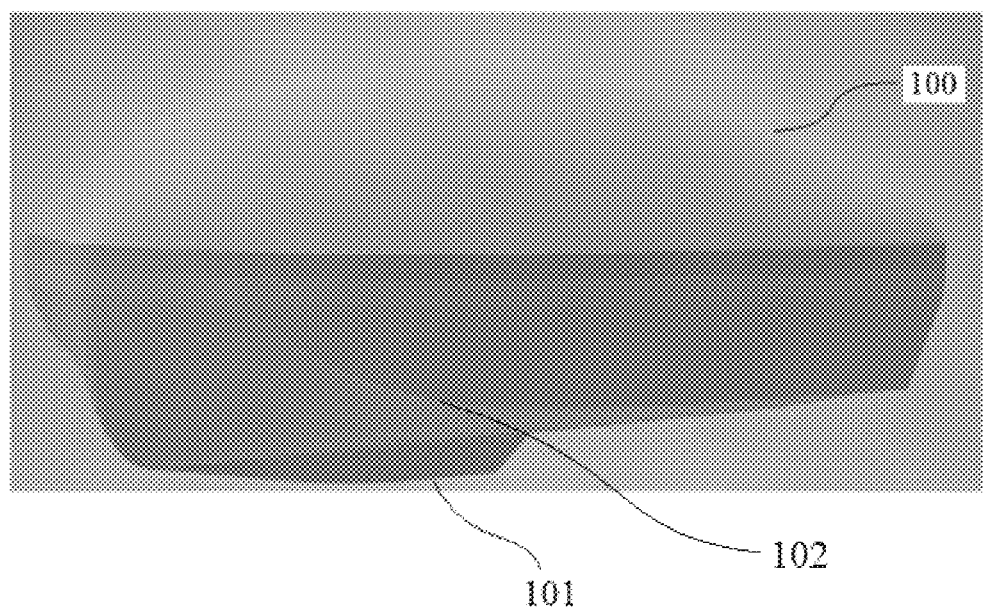
FIG. 1 is a first view of a hull of a boat of the invention.
Figure 2:
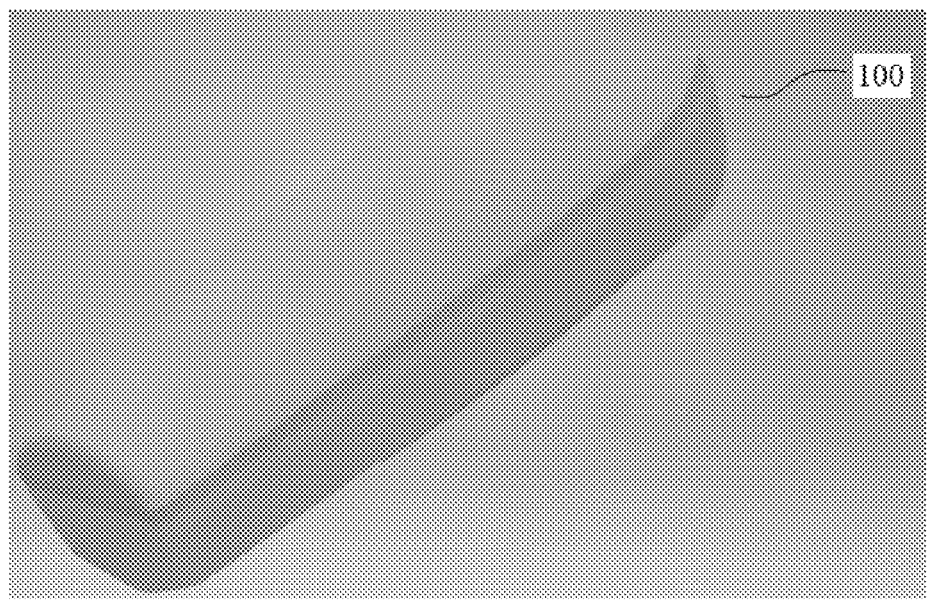
FIG. 2 is a second view of the hull of the boat of the invention.

FIGS. 1-2 show different views of an embodiment of a hull 100 of an embodiment of a boat of the invention. In certain embodiments, the boat is about 20 to 50 inches long and about 5 to 30 inches wide. In certain embodiments, dimensions for the boat are about 33 inches long to about 14 inches wide. The skilled artisan will appreciate that these dimensions are exemplary and that the boat can be designed to have other dimensions, which can be determined by the skilled artisan based upon the conditions in which the boat is to be deployed as well as the amount of weight the boat will need to carry or pull. In certain embodiments, the boat is sized so that it can be transported on a back of an operator. In such embodiments, the boat may include one or more couplings (e.g., eyelets) along the hull 100 that allow straps (such as back-pack straps) or clips to be connected to the boat.

As shown in FIGS. 1-2, the hull 100 is fully covered, protecting an inside of the boat while also forming an interior compartment within the boat. The hull does not need to be a fully covered hull. For example, in certain embodiments, the hull only has a partial cover, i.e., only a portion of the hull is fully enclosed, such as at least 1% of the hull is enclosed, at least 5% of the hull is enclosed, at least 10% of the hull is enclosed, at least 15% of the hull is enclosed, at least 20% of the hull is enclosed, at least 25% of the hull is enclosed, at least 30% of the hull is enclosed, at least 35% of the hull is enclosed, at least 40% of the hull is enclosed, at least 45% of the hull is enclosed, at least 50% of the hull is enclosed, at least 55% of the hull is enclosed, at least 60% of the hull is enclosed, at least 65% of the hull is enclosed, at least 70% of the hull is enclosed, at least 75% of the hull is enclosed, at least 80% of the hull is enclosed, at least 85% of the hull is enclosed, at least 90% of the hull is enclosed, at least 95% of the hull is enclosed, or at least 99% of the hull is enclosed.

Figure 3A:
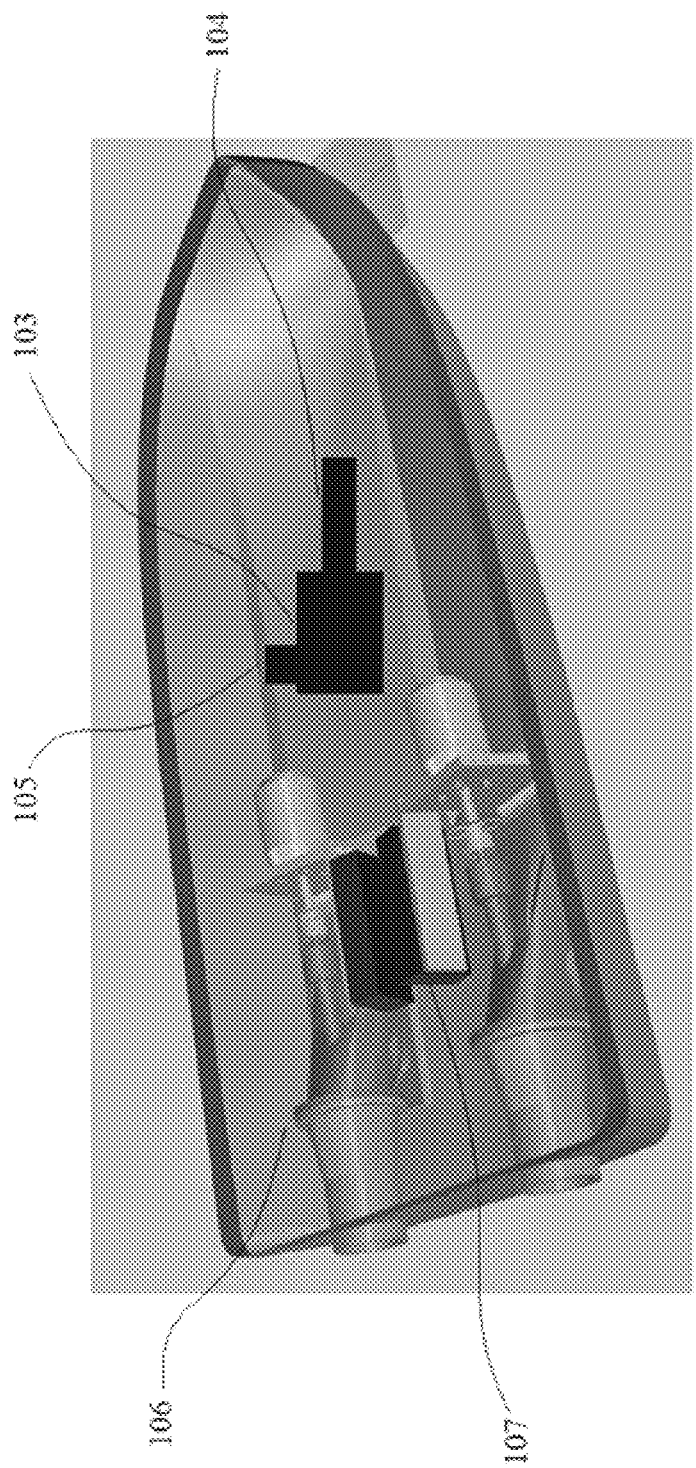
FIG. 3A shows an inside view of an embodiment of the boat of the invention.

Within the enclosed portion of the hull, there can be one or more compartments. The hull 100 includes a single storage compartment (the inside of which is shown in FIG. 3A). Typically, at least one of the enclosed compartments is made with water tight seals so that the compartment is water proof. In a preferred embodiment, each of the enclosed compartments is water tight. There can be a single access point from the hull to the one or more enclosed compartments. Alternatively, there can be more than one access point from the hull to the one or more enclosed compartments. In certain embodiments, each compartment has its own access point on the hull. Water tight compartments are formed with water tight seals and water tight hinges. Water tight seals and hinges are commercially available from, for example Simolex Rubber Corporation (Plymouth, Mich.).

The skilled artisan will appreciate that the design of hull 100 is exemplary and that other hull designs are within the scope of the invention. For example, the hull could have different shapes and depths from those shown in FIGS. 1-2. For example, the hull 100 could be any of a smooth curve hull (rounded without have any chines or corners); a chined or hard chined hull (hull made up of flat panels, which meet at a sharp angle known as the chine); flat-bottomed hull; displacement hull (hulls that have a shape that does not promote planning); or planing hull (hull with a shape that allows the boat to rise higher and higher out of the water as the speed increases).

Hull 100 is shown with one keel 101, and two bilge keels 102, one on each side of the boat. The bilge keels are used to reduce the boat's tendency to roll. In certain embodiments, more than two bilge keels are used. When used in pairs, a bilge keel is typically positioned for each side of the boat. The bilge keels increase hydrodynamic resistance to rolling, making the boat roll less, thereby acting as a passive stability system.

The hull is composed of any material suitable for use for boat hulls. Exemplary materials include wood (e.g., Teak, Totara and cedars), steel, iron, aluminum, fiberglass, composite materials (e.g., plastics reinforced with fibers other than (or in addition to) glass), or steel-reinforced cement (ferrocement). The hull can be designed and constructed using standard boat building techniques, such as those shown in Chapelle (Boatbuilding, W.W. Norton Company, Inc., 1994), Rossel (The Boatbuilder's Apprentice, McGraw Hill Professional, 2007), or Bruce et al. (Ship Construction, 7th Ed., Butterworth-Heinemann, 2012), the content of each of which is incorporated by reference herein in its entirety.

In certain embodiments, hull 100 is designed to be a self-righting hull. Generally, to be self-righting, the hull is sealed and has a very low center of gravity so as to provide a strong righting moment. The righting moment is a moment that tends to restore a marine vessel to its previous attitude after any small rotational displacement (also known as the restoring moment). How to design a boat to have a self-righting hull is described for example in Molland ("The Maritime Engineering Reference Book: A Guide to Ship Design", Elsevier Ltd., 2008), the content of which is incorporated by reference herein in its entirety.

Reference is now made to FIG. 3A, which shows an inside view of an embodiment of the boat of the invention. The boat includes a first central processing unit 103, a communication unit 104, and a global positioning unit 105. First central processing unit 103 includes one or more processors and memory as well as an input/output mechanism. Typically, the central processing unit includes an integrated circuit. The CPU is coupled to a storage or memory for storing instructions for implementing instructions received from the controller. Memory according to the invention can include a machine-readable medium on which is stored one or more sets of instructions (e.g., software) embodying any one or more of the methodologies or functions described herein. The software may also reside, completely or at least partially, within the main memory and/or within the processor during execution thereof by the computer system, the main memory and the processor also constituting machine-readable media. The software may further be transmitted or received over a network via the network interface device. The first central processing unit 103 can also include one or more ports that can receive either a USB stick or other machine readable medium, so that information can be uploaded into the first central processing unit 103, such as software updates or updated marine maps. The port can also be used to interface the first central processing unit 103 with a computer to upload or download other information from the first central processing unit 103.

Global positioning unit 105 (receiver) can be any commercially available system, such as those commercially available from Garmin. The Global Positioning System (GPS) is a satellite-based navigation system made up of a network of 24 satellites placed into orbit by the U.S. Department of Defense. GPS works in any weather conditions, anywhere in the world, 24 hours a day. GPS satellites circle the earth twice a day in a very precise orbit and transmit signal information to earth. GPS receivers take this information and use triangulation to calculate the user's exact location. Essentially, the GPS receiver compares the time a signal was transmitted by a satellite with the time it was received. The time difference tells the GPS receiver how far away the satellite is. Now, with distance measurements from a few more satellites, the receiver can determine the user's position and display it on the unit's electronic map.

A GPS receiver must be locked on to the signal of at least three satellites to calculate a 2D position (latitude and longitude) and track movement. With four or more satellites in view, the receiver can determine the user's 3D position (latitude, longitude and altitude). Once the user's position has been determined, the GPS unit can calculate other information, such as speed, bearing, track, trip distance, distance to destination, sunrise and sunset time and more. The GPS receive will typically include an antenna, positioned within the enclosed hull 100 or on an exterior of the hull 100, so that it is not enclosed. Any type of antenna can be used.

GPS navigation devices vary in sensitivity, speed, vulnerability to multipath propagation, and other performance parameters. High Sensitivity GPS receivers use large banks of correlators and digital signal processing to search for GPS signals very quickly. This results in very fast times to first fix when the signals are at their normal levels, for example outdoors. When GPS signals are weak, for example inside an enclosed space, the extra processing power can be used to integrate weak signals to the point where they can be used to provide a position or timing solution.

GPS signals are already very weak when they arrive at the Earth's surface. The GPS satellites only transmit 27 W (14.3 dBW) from a distance of 20,200 km in orbit above the Earth. By the time the signals arrive at the user's receiver, they are typically as weak as −160 dBW, equivalent to one tenth of a million-billionth of a watt (100 attowatts). This is well below the thermal noise level in its bandwidth. When not in an enclosure, GPS signals are typically around the −155 dBW level.

Conventional GPS receivers integrate the received GPS signals for the same amount of time as the duration of a complete C/A code cycle which is 1 ms. This results in the ability to acquire and track signals down to around the −160 dBW level. High Sensitivity GPS receivers are able to integrate the incoming signals for up to 1,000 times longer than this and therefore acquire signals up to 1,000 times weaker, resulting in an integration gain of 30 dB. A good High Sensitivity GPS receiver can acquire signals down to −185 dBW, and tracking can be continued down to levels approaching −190 dBW. Examples of high sensitivity receiver chips include SiRFstarIII and MediaTek's MTK II. An exemplary high sensitivity GPS receiver is described for example in McBurneyus (U.S. Pat. No. 6,674,401), the content of which is incorporated by reference herein in its entirety.

The global positioning unit 105 (receiver) may be loaded with one or more marine charts. In that manner, the boat can use information from the global positioning unit 105 for obstacle avoidance and for navigation. The global positioning unit 105 (receiver) is operably coupled to the CPU 103 such that information received by the global positioning unit 105 (receiver) is transmitted to the CPU 103. The CPU 103 is also operably coupled to a communication unit 105.

The communication unit 104 can be any radio transmitter and/or receiver that transmits and/or receives radio waves and converts the information carried by them to a usable form. The receiver portion of the communication unit 104 will typically include a crystal that oscillates at a specific frequency and inductors. It will typically be used with an antenna (mounted within the enclosure of the hull or outside of the enclosure), although not required. The antenna intercepts radio waves (electromagnetic waves) and converts them to tiny alternating currents that are applied to the receiver, and the receiver extracts the desired information. The receiver uses electronic filters to separate the desired radio frequency signal from all the other signals picked up by the antenna, an electronic amplifier to increase the power of the signal for further processing, and finally recovers the desired information through demodulation. The digital signal from the communication unit 104 is transmitted to the CPU 103. The communication unit 104 may be a separate piece of electronic equipment, or an electronic circuit within another device, such as within the CPU 103. An exemplary communication unit for a boat is made by FlySky. Other remote control receivers that can be used with boats of the invention are commercially available from Texas Instruments. An exemplary receiver from Texas Instruments is the TMS3637 receiver chip. Methods for integrating such a chip with a CPU 103 are described in the product manual entitled "TMS3637 Remote Control Transmitter/Receiver Data Manual", the content of which is incorporated by reference herein in its entirety.

Figure 3B:
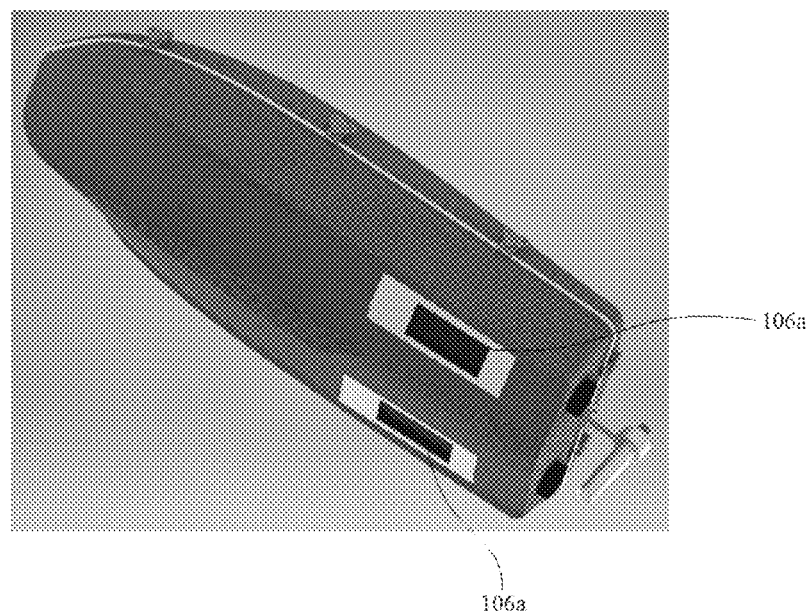
FIG. 3B shows a bottom view of an embodiment of the boat of the invention.

Typically, boats of the invention will include one or more propulsion units, shown as 106 in FIGS. 3A-B. The embodiment in FIGS. 3A-B shows two propulsion units 106, although the skilled artisan will appreciate that boats of the invention can include any number of motors, 1, 2, 3, 4, 5, etc. The propulsion units can be any type of engine typically used with a boat, such a propeller based system (inboard or outboard). Alternatively, the propulsion unit can be a water jet engine (pump-jet, hydrojet, or water jet) such as those used in jet skis. In such a system, water is sucked in through a large intake grate on the bottom of the craft. Power is provided by an engine, which powers an impeller (water pump), which is a propeller fitted completely within a pipe so it sucks water in at one end of the pipe, through water intakes 106a, and blows it out of the other end as a high-speed, high-pressure jet. The impeller typically has three blades made of stainless steel and is about 2-100 mm (e.g., 2 mm, 3 mm, 4 mm, 5 mm, 10 mm, 15 mm, 20 mm, 25 mm, 30 mm, 35 mm, 40 mm, 45 mm 50 mm, 55 mm, or 60 mm) in diameter. Some of the water sucked in is also used to cool the engine. The water exits through a steerable nozzle at the back of the craft. It's somewhat smaller than the water intake, which helps to build up pressure and speed. Water jet engines are commercially available from HamiltonJet. The two propulsion units 106 shown in FIGS. 3A-B are water jet engines. The propulsion units can be gas powered (including 2 or 4 stroke motors) or can be powered by batteries, such as lithium ion batteries or lithium iron phosphate ($LiFePO_4$) batteries). In the exemplary embodiment in FIGS. 3A-B, each propulsion unit 106 is powered by a set of batteries 107.

The skilled artisan will appreciate that the propulsion units do not need to have exit ports at the back of the boat, as exemplified in FIGS. 3A-B. Rather, the propulsion units may have different locations along the boat, such as protruding from the sides of the boat (with the exit port pointing toward the stern of the boat), or protruding from below the boat (with the exit port pointing toward the stern of the boat).

In certain embodiments, boats of the invention are configured to transport a person or one or more pieces of cargo. In that manner, the hull 100 is designed to have a buoyancy such that the boat will not sink when transporting the weight of a person and/or cargo. How to design a boat to have the required buoyancy to transport the weight of a person and/or cargo is known in the art and is described for example in Biran ("Ship Hydrostatics and Stability", Butterworth-Heinemann, 2003), the content of which is incorporated by reference herein in its entirety. Additionally, the propulsion units are sized and configured to have the power to transport the weight of a person and/or cargo. To determine the proper horsepower needed for the propulsion unit, one calculates the anticipated total weight of the boat with passengers, fuel and gear, then determines the best cruise speed they want to attain. Typically, the propulsion unit will have anywhere from 1-hp to 100-hp (1 hp, 5 hp, 10 hp, 15 hp, 20 hp, 25 hp, 30 hpm, 35 hp, 40 hp, 45 hp, 50 hp, 55 hp, 60 hp, 65 ph, 70 hp, 75 hp, 80 hp, 85 hpm, 90 hp, 95 hp, or 100 hp), and can be any value in between those ranges. Methods and formula for determining the proper horsepower needed for the propulsion unit are described for example in Gerr ("The Nature of Boats: Insights and Esoterica for the Nautically Obsessed", International Marine Publishing, 1995) and Brewer ("Understanding Boat Design", McGraw Hill Professional, 1993), the content of each of which is incorporated by reference herein in its entirety.

Figure 4:
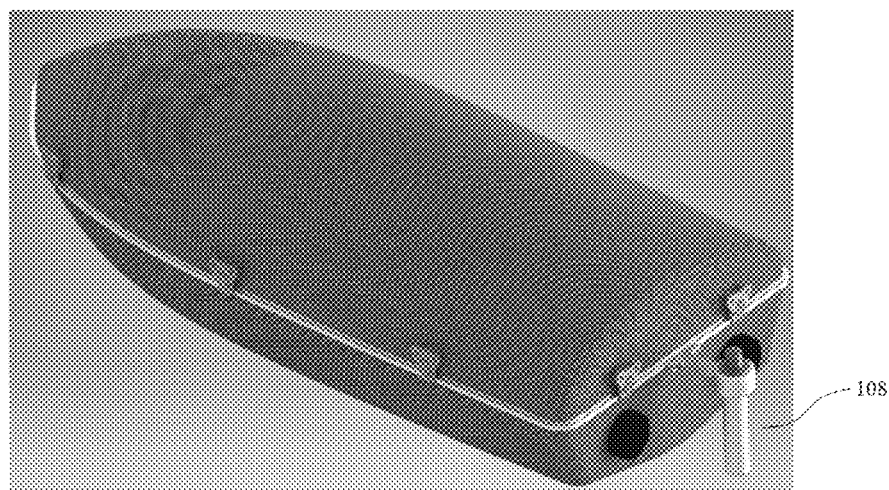
FIG. 4 shows an embodiment of a boat including a handle that a person can hold.
Figure 5A:
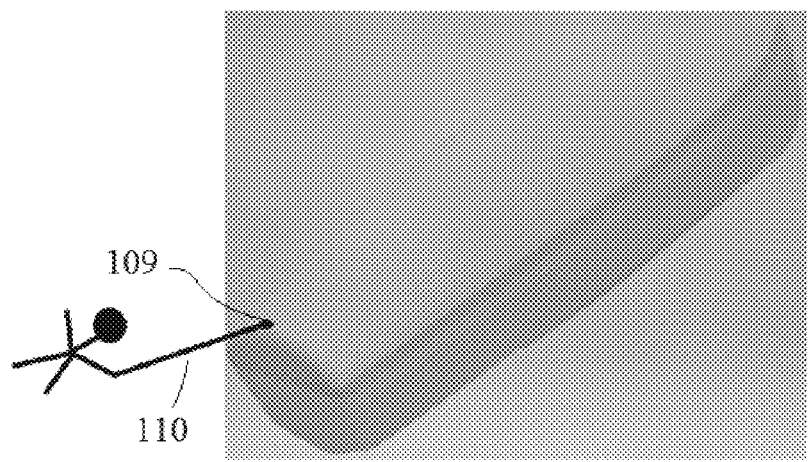
FIG. 5A shows an embodiment of a boat including a tow line held by a person.
Figure 5B:
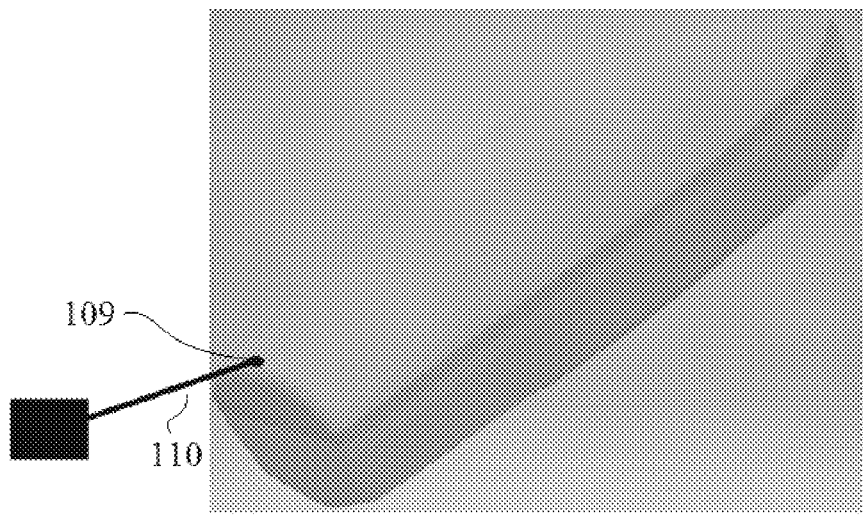
FIG. 5B shows an embodiment of a boat including a tow line coupled to cargo.

In certain embodiments, the boat includes one or more handles 108, that can be gripped by a person (FIG. 4). The person holds one or more handles while being pulled by the boat. The handles can be coated with a material that increases the friction of the handle, making it easier to grip. In other embodiments, the boat includes one or more hookups 109 for a tow line 110 (FIGS. 5A-B). A person holds the tow line, as shown in FIG. 5A or cargo (e.g., surfboard, a second boat, and scuba tanks) is coupled to the tow line for towing, as shown in FIG. 5B. In certain embodiments, the tow line is coupled to the person so that the person does not have to hold the line with their hand. The hook-up can be any type of connector to which a tow line can be coupled, such as an eye-let through which a tow line can be coupled or a cleat to which a tow line can be coupled.

Figure 6:
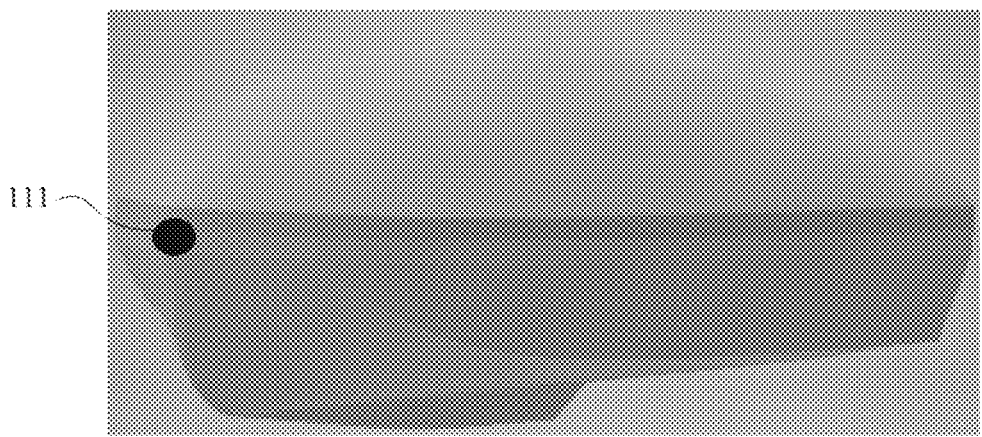
FIG. 6 shows an embodiment of a boat including an ultrasound sensor.

In certain embodiments, the boat includes one or more sensors, that sense an environment in or around the boat. For example, the boat can include one or more temperature sensors, one or more chemical sensors, one or more light sensors, one or more audio sensors, one or more level sensors, one or more wind sensors, or any combination of the different types of sensors. The sensors can be mounted within the hull or outside the hull. The sensors can be mounted on any external part of the hull, e.g., top, bottom, or sides. In certain embodiments, the boat includes one or more ultrasound sensors 111 (FIG. 6). The ultrasound sensors can be configured for collision avoidance, such as described for example in Nolan et al., ("A low directivity ultrasonic sensor for collision avoidance and station keeping on inspection-class AUVs, Journal of Marine Engineering and Technology, A11:1-11, 2008) or Gabriel (U.S. Pat. No. 6,394,015), the content of each of which is incorporated by reference herein in its entirety. In operation, the first central processing unit integrates information it receives from the first global positioning unit and the ultrasound sensor to be able to autonomously navigate to a location while avoiding obstacles.

Figure 7A:
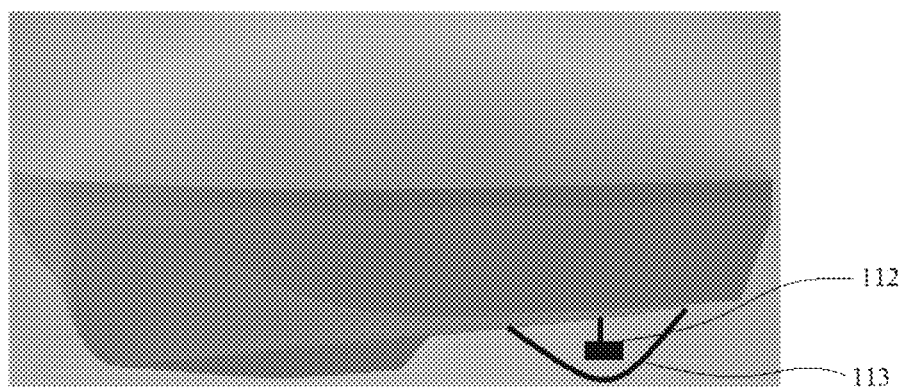
FIG. 7A shows an embodiment of a boat having a video camera mounted in an optically clear portion beneath the boat.
Figure 7B:
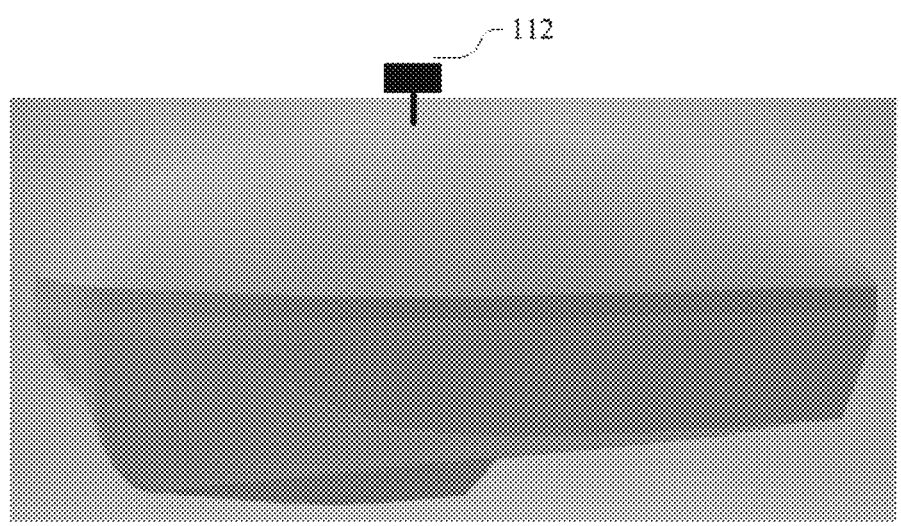
FIG. 7B shows an embodiment of a boat having a video camera mounted on top of the boat.

In certain embodiments, the boat includes one or more video cameras 112 (e.g., 2, 3, 4, 5, 6, 7, 8, 9, 10 etc.) that transmits a video signal to a display screen of the controller. An exemplary video camera is a 2.4 GHz wireless camera, although any type of video camera (wireless or not) can be used. The camera can be mounted within the hull or can be a waterproof camera mounted outside the hull or enclosed in a water-proof casing outside of the hull. The cameras can be positioned at multiple different locations on the boat to give multiple different views. Alternatively, the camera can be mounted on a moving stage that rotates and moves up and down, so as to obtain numerous different views from a single camera. For example, the camera 112 is mounted in an optically clear portion 113 beneath the boat (FIG. 7A). Alternatively or additionally, the camera 112 is mounted on top of the boat (FIG. 7B).

Figure 8:
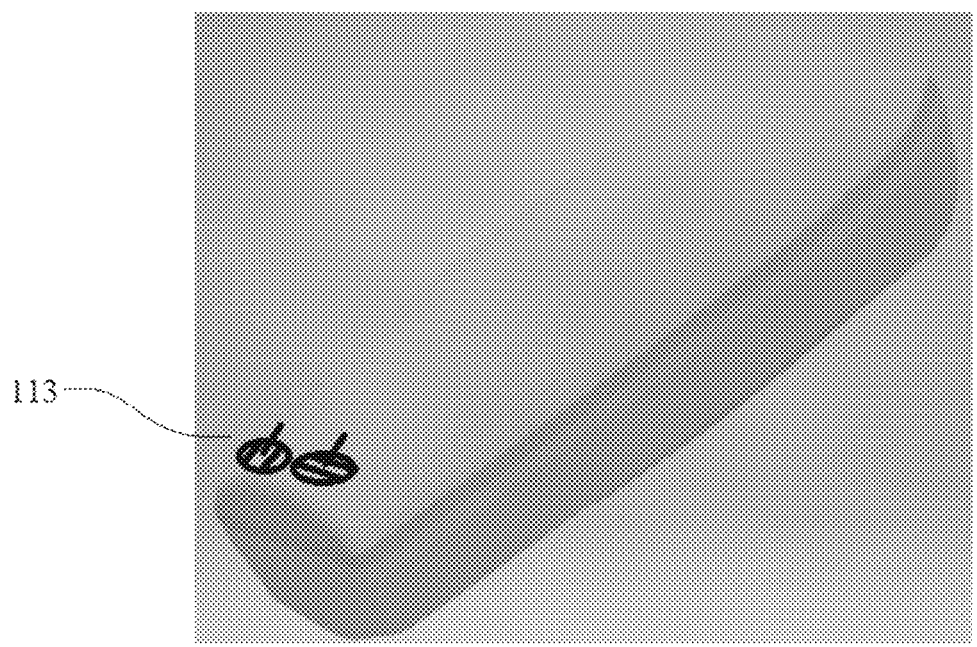
FIG. 8 shows an embodiment of a boat having a local control unit.

In certain embodiments, the boat further comprises a local control unit 113 onboard the boat (FIG. 8). In that manner, an operator can locally control the boat if desired. The local control unit can be a standard steering and throttle mechanism, as used on commercially available jet skis. Alternatively, the control unit can be similar to those of a remote control, having a first lever to control forward and backward movement and a second lever to control left and right movement.

Figure 9A:
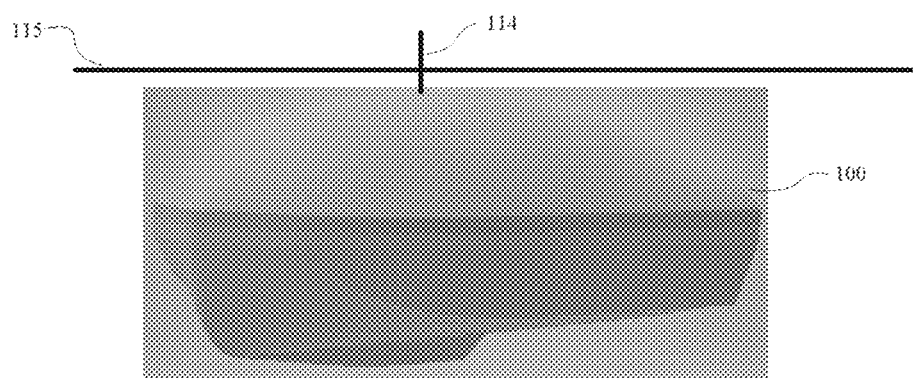
FIGS. 9A-B show an embodiments of a submersible boat.
Figure 9B:
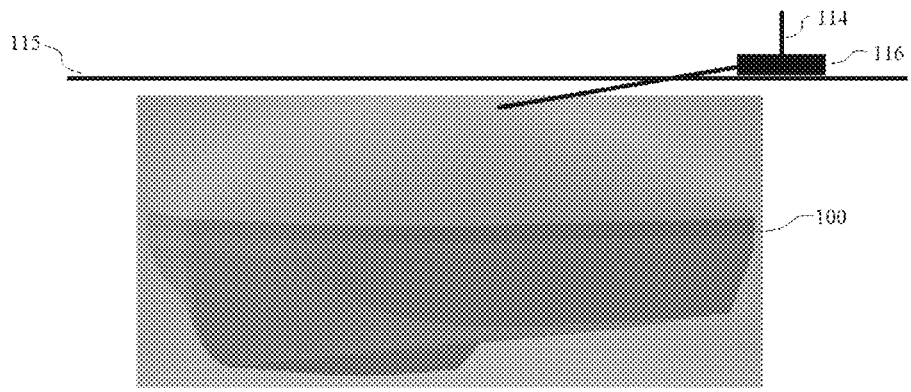

Generally, boats of the invention travel on a surface of the water. However, in certain embodiments, the boat is a submersible boat configured to travel beneath the water's surface (FIGS. 9A-B). In such embodiments, the submersible boat includes an antenna 114 that remains above the water's surface 115. The antenna can be directly coupled to the hull 100 of the boat (FIG. 9A) or can be pulled on a floating member 116 that is coupled to the boat (FIG. 9B). In such embodiments, boats of the invention include a remotely controlled ballast system. The ballast system is operably coupled to the first central processing unit, so that the remote control can control the depth of the boat through communication with the first central processing unit. The depth of the boat can be relayed to a remote operator from a depth sensor on the boat or from a video feed of a camera on the boat. Alternatively, the ballast system can be designed to ensure that the boat only reaches a maximum depth of a few feet beneath the water, and therefore sensing the actual depth of the boat upon being submerged may not be important to a remote operator. The local control unit 113 may also include controls to operate the ballast system so that an operator can locally control submersion of the boat.

Figure 10:
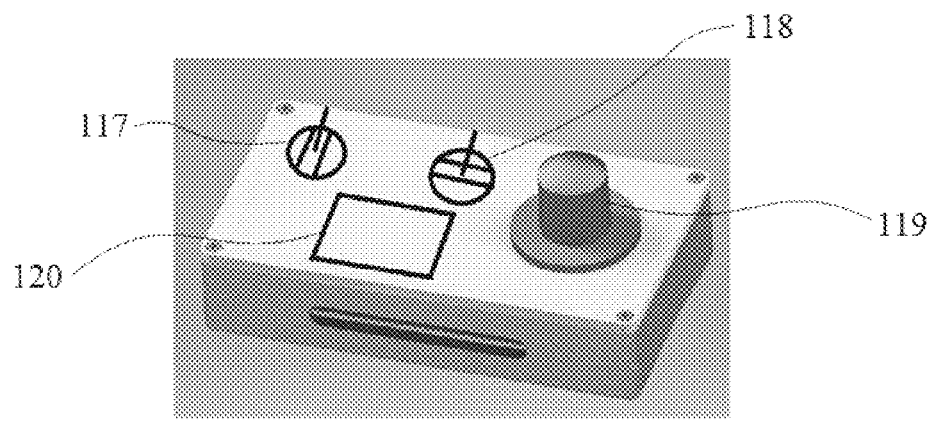
FIG. 10 shows an exemplary embodiment of a controller of the invention.

Reference is now made to FIG. 10, which illustrates an exemplary embodiment of a remote controller of the invention. The skilled artisan will appreciate that the controller illustrated in FIG. 10 is only exemplary and that numerous different controller configurations are possible. Those such configurations are within the scope of the invention. The controller includes controls for operation and steering of the boat. For example, lever 117 controls forward and backward movement of the boat, sending instructions to the boat that operate the propulsion unit(s) of the boat. Lever 118 controls steering, left and right movement, of the boat. Lever 118 sends instructions to the boat that turn the propulsion units (in the case of water jets), operate a rudder in order to steer the boat, or vary the power levels of the water jets in order to steer the boat. The controller may also optionally include a display screen 120 that receives a video feed from the boat or displays other information that assists a person to operate the boat, such as a display of a marine map with the real-time position of the boat. The system is configured such that not moving any levers or pressing any buttons on the controller causes the boat to stop and await further commands.

The controller also includes a button 119 that activates certain operation modes for the boat, which will be discussed in greater detail below. The controller can optionally include an antenna.

Figure 11:
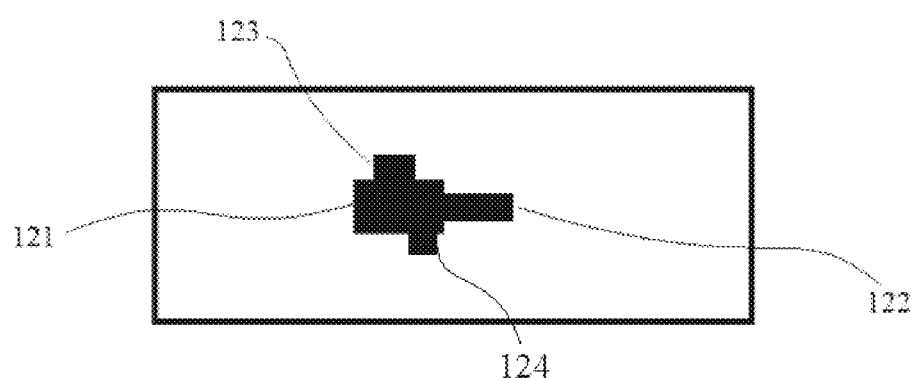
FIG. 11 shows an exemplary embodiment of an inside of the controller of the invention.

FIG. 11 illustrates an inside of the controller. The inside of the controller includes a second central processing unit 121, a second global positioning unit 122, a transmitter 124, and/or a receiver 124. The second central processing unit, second global positioning unit, and receiver, described above can be used in the controller. The transmitter can be any type of transmitter that emits radio waves. An exemplary transmitter is the FlySky FS-T6 2.4 ghz Digital Proportional 6 Channel Transmitter, commercially available from HobbyPartz. Another exemplary transmitter is a XBee-PRO XSC 900 MHz Long-Range RF Module. The controller also includes a power source, such as a battery. The controller can also include one or more ports that can receive either a USB stick or other machine readable medium, so that information can be uploaded into the controller, such as software updates or updated marine maps. The port can also be used to interface the controller with a computer to upload or download other information from the controller.

Figure 12:
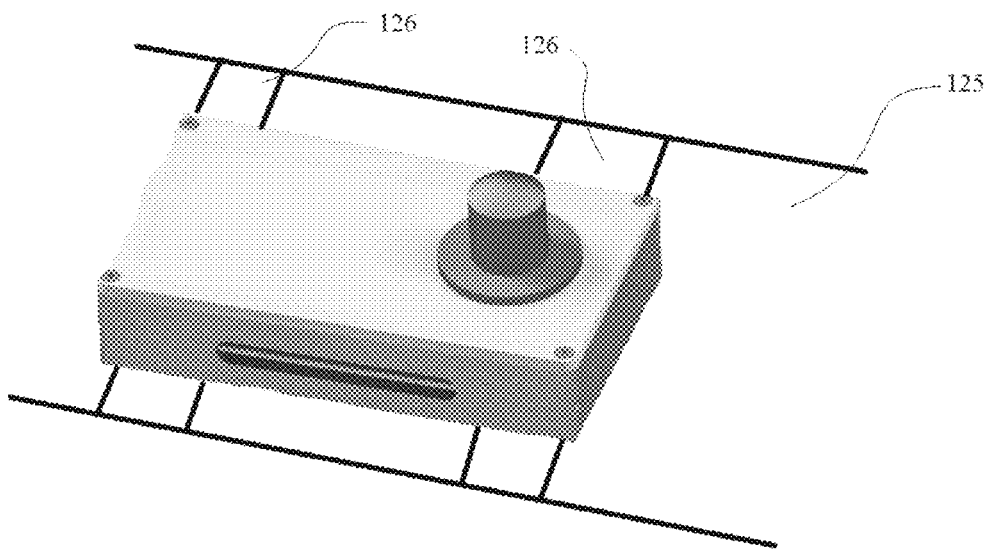
FIG. 12 shows an exemplary embodiment of a controller configured to be worn on a wrist of an operator, held by one or more straps.

In certain embodiments, the controller is configured to be a hand-held controller. In, other embodiments, the controller is configured to be worn by an operator. The controller can be worn on part of the operator, e.g., chest, upper arm, lower arm (forearm), wrist, back of the hand, upper leg, etc. In certain embodiments, the controller is configured to be worn on a wrist 126 of the operator (FIG. 12). In such embodiments, the controller can include one or more straps or bands 125 that facilitate a coupling of the controller to the operator.

In operation, the transmitter sends radio waves to an antenna of the communication unit (receiver) on the boat. The communication unit receives the signals from the transmitter, processes those signals as described above and sends that information to the first central processing unit. The first central processing unit then instructs the boat by activating the propulsion unit(s) and/or steering the boat. Typically, the transmitter operates at either 27 MHz or 49 MHz, however, other frequencies are possible, such 72-MHz or 75-MHz frequencies, or the 900 MHz band. In certain embodiments, the transmitted signal is sent at an encrypted signal using standard encryption techniques.

There are numerous modes of operation for the boat system of the invention, at least three of which are described herein. However, the skilled artisan will realize that additional modes of operation are possible with both the boat and the controller have global positioning systems, and such additional modes of operation are within the scope of the invention. In a first mode of operation (remote control mode), the first central processing unit executes one or more instructions received from the controller via the communication unit to navigate the boat. In a second mode of operation (stay here or hold mode), the first central processing unit executes one or more instructions received from the controller via the communication unit to maintain a location of the boat utilizing coordinates the first central processing unit receives from the first global positioning unit. In a third mode of operation (come to me or follow me mode), the first central processing unit executes one or more instructions received from the controller via the communication unit to navigate the boat to a location of the controller utilizing coordinates received from the first global positioning unit and coordinates from the second global positioning unit transmitted from the controller to the first central processing unit via the communication unit.

In remote control mode, the operator actively navigates the boat using the controller. For example, operating at 27.9 MHz, below is an exemplary sequence for controlling the boat of the invention via the remote controller. Lever 117 is actuated forward. That causes a hall effect sensor to send a signal to an integrated circuit (IC) within the second central processing unit 121. The signal causes the transmitter 123 to transmit navigation instructions to the communication unit 104 of the boat, which may be constantly (or intermittently) monitoring for those signals. When the communication unit 104 (receiver) receives navigation instructions from the transmitter 123, it sends those instructions to the IC of the first central processing unit 103 in the boat, which enacts those instructions and starts the appropriate propulsion unit(s) 106. The propulsion units 106 are activated and the boat navigates based on the received navigation instructions.

When the boat is within eye site an operator, the operator can navigate the boat without the use of any additional information. When the boat is not within eye site of the operator, the operator can use the display screen to navigate the boat. For example, real-time video data from one or more cameras on the boat is transmitted from the communication unit 104 on the boat to receiver 124 in the controller. The video data is processed and displayed on display 120, allowing an operator to navigate the boat using the real-time video feed. Alternatively, the second global positioning unit includes marine maps that can be displayed on display 120. Global positioning data from the first global positioning unit 105 on the boat is transmitted from the communication unit 104 on the boat to receiver 124 in the controller. The global positing data on the boat is processed and integrated with the marine map to produce a real-time location of the boat on the display 120 in the marine map. The location of the boat is updated in real-time, and the operator can navigate the boat using the integrated information displayed on the display 120.

The boat also operates in one or more autonomous navigation modes. For example, the boat can operate in a stay here or hold mode. In that mode of operation, the operator pushes button 119 on the controller once, which causes the controller to transmit one or more instructions to the first central processing unit 103 of the boat. The first central processing unit executes the one or more instructions received from the controller via the communication unit to maintain a location of the boat utilizing coordinates the first central processing unit receives from the first global positioning unit, and optionally, any required information from a marine map loaded on the boat's system. The first central processing unit 103 also integrates the global positioning data with one or more marine maps loaded onto the first central processing 103 so that the boat can avoid obstacles while maintaining its position (location). The position (location) of the boat can be transmitted by the boat to the controller and displayed on display screen 120 of the controller, informing the operator of the location of the boat.

Another autonomous mode of operation is come to me or follow me mode. In that mode, the operator pushes button 119 on the controller twice, which causes the controller to transmit one or more instructions to the first central processing unit 103 of the boat. The first central processing unit 103 executes the one or more instructions received from the controller to navigate the boat to a location of the controller utilizing coordinates received from the first global positioning unit 105 and coordinates from the second global positioning unit 122 transmitted from the controller to the first central processing 103 unit. The first central processing unit also integrates the global positioning data with one or more marine maps loaded onto the first central processing 103 so that the boat can avoid obstacles while navigating to the position of the controller. The position (location) of the boat can be transmitted by the boat to the controller and displayed on display screen 120 of the controller, informing the operator of the location of the boat.

The skilled artisan will recognize that the same button does not need to be used to activate the different types of autonomous operation. There can be a single button or switch for each autonomous mode of operation. Alternatively, a dial can be used, in which turning the dial one direction (e.g., clockwise) actives a first mode of autonomous operation and turning the dial another direction (e.g., counter clockwise) actives a second mode of autonomous operation.

Combinations of Embodiments

As will be appreciated by one skilled in the art, individual features of the invention may be used separately or in any combination. Particularly, it is contemplated that one or more features of the individually described above embodiments may be combined into a single system.

Incorporation by Reference

References and citations to other documents, such as patents, patent applications, patent publications, journals, books, papers, web contents, have been made throughout this disclosure. All such documents are hereby incorporated herein by reference in their entirety for all purposes.

EQUIVALENTS

Various modifications of the invention and many further embodiments thereof, in addition to those shown and described herein, will become apparent to those skilled in the art from the full contents of this document, including references to the scientific and patent literature cited herein. The subject matter herein contains important information, exemplification and guidance that can be adapted to the practice of this invention in its various embodiments and equivalents thereof.

What is claimed is:

1. A remote controlled boat system, the system comprising:
   a boat comprising a first central processing unit operably coupled to a communication unit and a first global positioning unit operably coupled to the first central processing unit; and
   at least one controller configured to control the boat via remote communication with the boat, the controller comprising a second central processing unit operably coupled to a second global positioning unit
   wherein the boat is configured to operate in one of a plurality of remotely controlled operating modes based, at least in part, on input from an operator via the at least one controller, the operating modes comprising:
      a first operating mode in which the first central processing unit executes one or more instructions received from the controller via the communication unit to navigate the boat
      a second operating mode in which the first central processing unit executes one or more instructions received from the controller via the communication unit to maintain a location of the boat utilizing coordinates the first central processing unit receives from the first global positioning unit; and
      a third operating mode in which the first central processing unit executes one or more instructions received from the controller via the communication unit to navigate the boat to a location of the controller utilizing coordinates received from the first global positioning unit and coordinates from the second global positioning unit transmitted from the controller to the first central processing unit via the communication unit;
   wherein the boat is further configured to operate in a locally controlled operating mode, the boat comprising a local control unit onboard including at least one of a throttle controller and a steering controller for receiving physical input from an operator to control at least one of a speed and a direction of the boat, respectively, in response to operator input; and
   wherein the boat comprises couplings on a portion thereof and a pair of shoulder straps connected to the couplings to thereby form a back-pack arrangement allowing for the boat to be secured to and transported on a back of an operator.

2. The system according to claim 1, wherein the boat comprises one or more handles configured such that a person can hold onto the boat while the boat is moving.

3. The system according to claim 1, wherein the boat comprises one or more hook-ups configured to couple with a tow line for towing a person or object while the boat is moving.

4. The system according to claim 3, wherein the object is selected from the group consisting of a surf board, a second boat, and scuba tanks.

5. The system according to claim 1, wherein the boat is a submersible boat configured to travel beneath a water surface and the submersible boat further comprises an antenna that remains above the water surface.

6. The system according to claim 1, wherein the boat comprises a propulsion unit.

7. The system according to claim 6, wherein the propulsion unit comprises a gas motor or an electrically powered motor.

8. The system according to claim 1, wherein boat comprises a storage compartment.

9. The system according to claim 1, wherein communication between the controller and the boat is encrypted.

10. The system according to claim 1, wherein the boat comprises an ultrasound sensor.

11. The system according to claim 10, wherein the ultrasound sensor is configured for obstacle avoidance.

12. The system according to claim 1, wherein the boat comprises a camera that transmits a video signal to a display screen of the controller.

13. The system according to claim 12, wherein the camera is mounted in an optically clear portion beneath the boat.

14. The system according to claim 12, wherein the camera is mounted on top of the boat.

15. The system according to claim 1, further comprising a plurality of controllers, each configured to control the boat via remote communication with the first central processing unit via the communication unit of the boat, wherein the first central processing unit implements a priority function that determines which of the plurality of controllers has priority to remotely control the boat.

16. The system according to claim 1, wherein the controller is configured to be worn by an operator.

17. The system according to claim 16, wherein the controller is configured to be worn on a wrist of the operator.

18. The system according to claim 1, wherein the controller further comprises a display screen.

19. The system according to claim 1, wherein the first central processing unit is configured to use machine vision for automatic obstacle avoidance.

20. The system according to claim 1, wherein the first global positioning unit comprises a marine map.

21. The system according to claim 20, wherein the first global positioning unit transmits information from the marine map to the first central processing unit to allow automatic navigation of the boat with obstacle avoidance.

22. The system according to claim 20, wherein the boat is configured to being self-righting.

23. The system according to claim 1, wherein the second global positioning unit comprises a marine map.

* * * * *